Dec. 1, 1925.
J. E. EGLESON
1,563,732
PROCESS OF ABSORBING HYDROCHLORIC ACID GAS
Filed Sept. 7, 1922   2 Sheets-Sheet 2
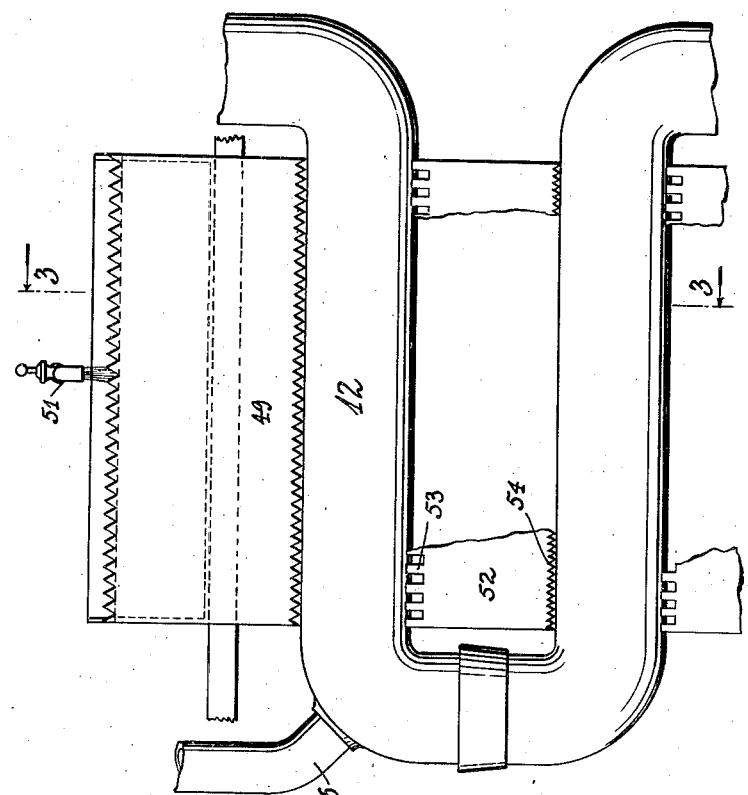
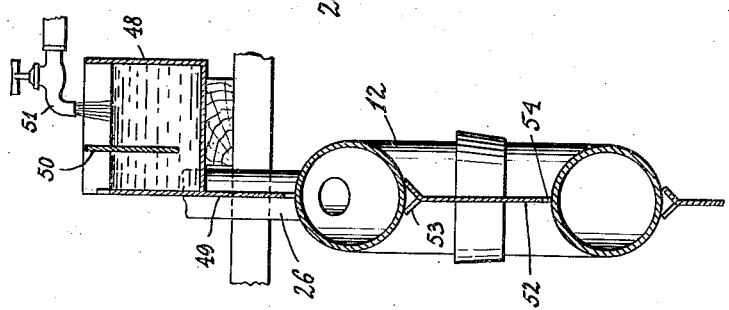
INVENTOR.
JAMES E. EGLESON
BY
ATTORNEYS Patented Dec. 1, 1925.

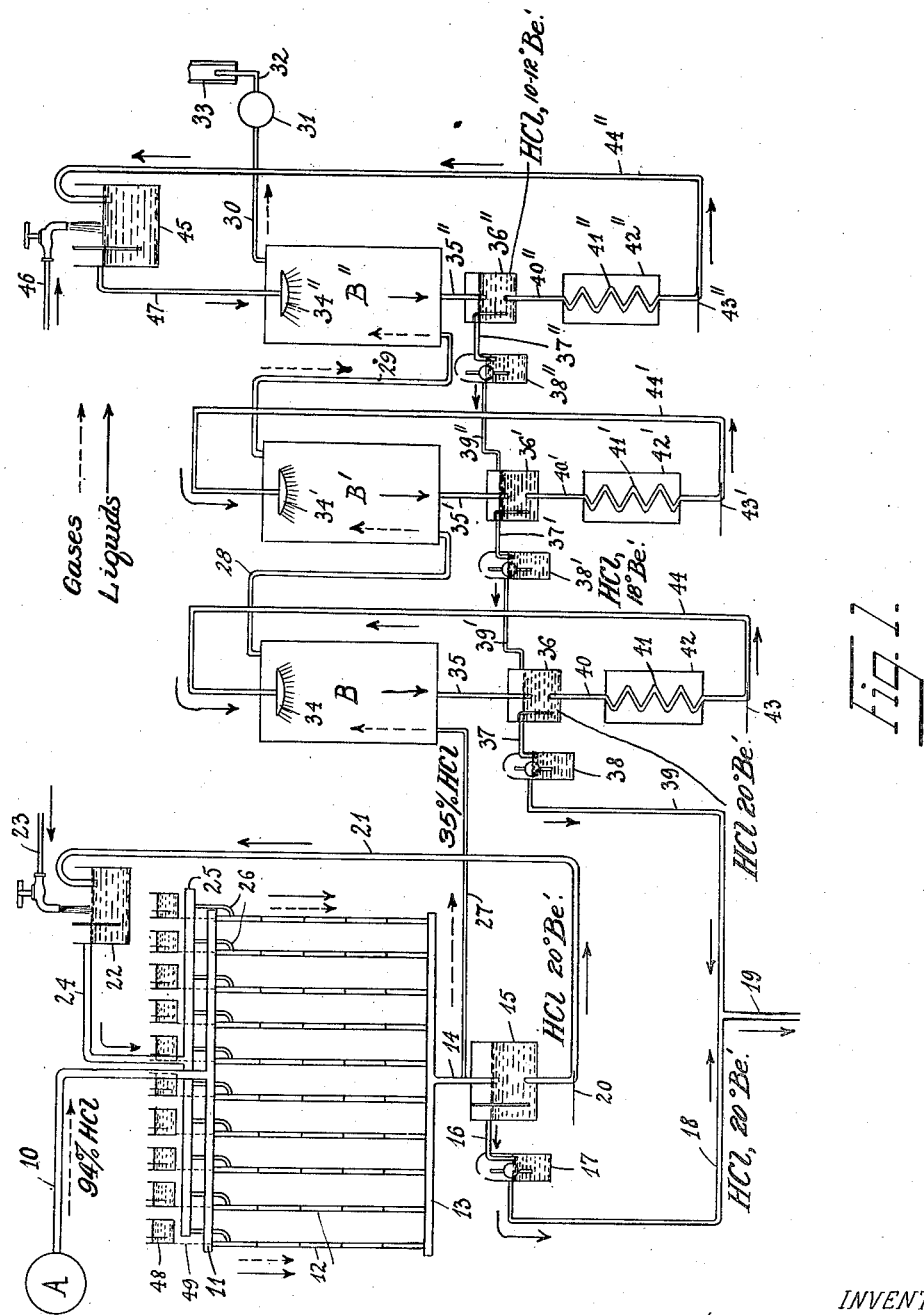

1,563,732

UNITED STATES PATENT OFFICE.

JAMES ERNEST EGLESON, OF RIDLEY PARK, PENNSYLVANIA, ASSIGNOR TO GENERAL CHEMICAL COMPANY, OF NEW YORK, N. Y., A CORPORATION OF NEW YORK.

PROCESS OF ABSORBING HYDROCHLORIC-ACID GAS.

Application filed September 7, 1922. Serial No. 586,587.

*To all whom it may concern:*

Be it known that I, JAMES ERNEST EGLESON, a citizen of the United States, and resident of Ridley Park, in the county of Delaware and State of Pennsylvania, have invented certain new and useful Improvements in Processes of Absorbing Hydrochloric-Acid Gas, of which the following is a specification.

In the manufacture of commercial hydrochloric acid by the absorption of hydrochloric acid gas in water or dilute liquid hydrochloric acid, comparatively large and expensive plants are required. The purpose of the present invention is to improve the procedure in such a way as to secure a greatly increased output with a plant of given size, or when a certain output is desired, to obtain it with a smaller plant than would be required with the present practice.

The new process will now be described in detail with reference to the accompanying drawings, in which Fig. 1 is a diagrammatic view of a plant for carrying out this process; Fig 2 is a side elevation of a portion of a cooler forming part of said plant; and Fig. 3 is a vertical section on line 3—3 of Fig 2.

A designates a still, a Mannheim furnace, or other generator of any well known or approved construction in which hydrochloric acid gas is produced as, for example, by the action of sulfuric acid on sodium chlorid. The gas passes through a conduit 10 to a header 11 from which it is distributed to a plurality of cooling tubes 12 connected in parallel, said tubes being S-shaped and made of suitable acid-resisting material, for instance, fused silica. The lower ends of the tubes 12 are connected with a collector 13 from which an outlet pipe 14 leads to a surge pot 15 the overflow from which passes through a pipe 16 to a hydrometer jar 17 and then through a pipe 18 to the product line 19. The cooling tubes 12 are supported in a well known manner so as to be cooled by the surrounding air in winter, but when air-cooling is not sufficient, as in summer, water is caused to flow over the outer surfaces of the tubes 12 with a so-called cascade effect. Any approved or well known construction may be employed for effecting the cooling action by air or water according to seasonable conditions.

By means of an air-lift 20, a portion of the liquid contained in the surge pot 15 is conveyed through pipe 21 to a receiver 22 to which water is supplied at 23. The receiver is located at a higher level than the cooling tubes 12, and through an overflow pipe 24 the liquid from the receiver passes to a manifold 25 provided with branches 26 having air-tight connections with the interior of the several tubes 12, at the upper portions of said tubes.

From the outlet pipe 14 a branch 27 leads to the bottom of an absorption tower B of any well known or approved construction (for instance, a chamber filled with coke). The top of the tower B has a connection 28 leading to the bottom of a similar tower B', and a connection 29 leads from the top of the second tower to the bottom of a similar third tower B''. From the top of the latter, a pipe 30 leads to the inlet of a fan or exhauster 31, the outlet of which is connected by a pipe 32 to the stack, as indicated at 33.

Each of the absorption towers contains a spray head 34, 34', 34'' of well known character, and an outlet pipe 35, 35', 35'' respectively for the liquid. The pipes 35, 35', 35'' discharge into surge jars 36, 36', 36'' respectively having overflow pipes 37, 37', 37'' leading to hydrometer jars 38, 38', 38'' respectively. The outlet of the jar 38 may be connected by a pipe 39 with the product line 19. From the hydrometer jars 38', 38'' pipes 39' and 39'' lead to the surge jars 36 and 36' of the preceding towers B and B' respectively. From each of the surge jars an outlet pipe 40, 40', 40'' leads to a cooling coil 41, 41', 41'' respectively usually made of glass and located in a cooler 42, 42', 42'' respectively. From the outlet of each cooling coil the liquid therein is conveyed, by the lifting action of compressed air admitted by a pipe 43, 43', 43'' respectively (air-lift), through a pipe 44, 44', 44'' respectively of which the pipes 44, 44' lead to the spray heads 34, 34' of the respective towers B, B'. The pipe 44'' leads to a tank 45 to which water is admitted at 46, the diluted liquid then passing to the spray head 34'' of the tower B'' through an overflow pipe 47.

The supply of water at 23 and 46, and the flow of gaseous and liquid HCl can be controlled so as to be constant during the normal operation of the plant, the flow of gas being induced or assisted by the action of the exhaust 31. The HCl gas produced in the generator A at a temperature of from 350° to 850° F. and passing through the pipe 10 has a temperature of from 175° to 250° F. when it reaches the header 11. The gas then divides into a plurality of streams (for instance ten) and flows downwardly through the cooling tubes 12 connected in parallel. At the upper end of each tube 12, a thin stream of cool liquid is introduced through the corresponding branch 26 of the manifold 25 to which such liquid is conveyed from the receiver 23 through the pipe 24. Tight joints are provided so that no air will enter the tubes 12 at the points where the cooling liquid is admitted. The amount of liquid passing through a tube 12 is small in comparison with the amount of gas passing through the same tube in the same unit of time. As stated above, during the cold season the cooling effect of the air will suffice to produce the desired action in the tubes 12, but during the summer water of a proper temperature will be employed to cool said tubes and the fluids therein, for instance, by causing water to flow over the outside of the tubes in the well known cascade fashion. The cool liquid flowing downward in the tubes 12 will absorb a very substantial portion of the HCl gas (for instance, as much as 50% of the HCl contained in the gas leaving the still). This gas, containing in a particular case 94% HCl, was brought down to a 35% HCl content at the point where the unabsorbed gas is caused to follow a separate path, through the pipe 27, while the liquid flows on alone through the lower portion of the pipe 14. This liquid is strong hydrochloric acid, its strength being about 20° Bé. in the example mentioned, but even more concentrated acid is obtainable according to this process, by using the proper relation of gas and cooling liquid, cooling surface, etc. A portion of the strong liquid acid thus obtained (for instance, 20° Bé.) is used as part of the commercial product, by overflowing from the surge pot 15 through the pipe 16, hydrometer jar 17, and pipe 18 to the product line 19. It will be seen that whatever proportion of the gaseous HCl is not absorbed in the cooling tubes 12, passes on through the pipe 27 to the absorption towers B, B', B''.

A portion of the liquid acid reaching the surge pot 15 through the outlet pipe 14 is brought back to the top of the tubes 12 as by means of the air-lift 20 raising said acid portion through the pipe 21 to the overhead receiver 22, where such acid is diluted by adding water, in the proper ratio, at 23. The amount of water added at this point is approximately the same as the amount of liquid overflowing at 16. It has been found that the absorption is facilitated by this circulation of acid through 20, 21, 22, but this feature is not absolutely essential, and results not quite so good, although still far superior to those obtained with the usual practice, will be secured if the parts 20, 21 are omitted, or cut out of operation, so that in this case only water would pass from the receiver 22 through the pipe 24 to the manifold 25, its branches 26 and the tubes 12, whereas in the case of circulating acid through 20, 21 the absorbing liquid admitted to the upper portions of the tubes 12 is a diluted aqueous solution of hydrochloric acid. The receiver 22 being open at the top, the air introduced at 20 will escape readily from the receiver.

The gases passing to the first absorption tower B through the pipe 27 have been cooled to a temperature of from 60° to 95° F. The gases travel upwardly in said first tower B, then pass through the pipe 28 to the second tower B' and travel upwardly therein, to then travel through the pipe 29 to the third tower B'' in which they again travel upwardly. In this last tower the gases containing only a small percentage of HCl meet a spray of relatively weak acid discharged through the head 34'', and the liquid produced by the absorption of gaseous HCl in the tower B'' and passing out through the pipe 35'' will be of a strength, for instance, of from 10° to 12° Bé. This acid is diluted to the desired degree by introducing water at 46, such acid having previously been cooled in the cooling coil 41'', and by means of air blown in at 43'', lifted through the pipe 44'' to the tank 45, from which the diluted acid passes through the pipe 47 to the spray head 34'', so that a portion of the acid discharged into the surge jar 36'' from the tower B'' is returned to the top of this tower. The remainder of the liquid acid in said surge jar 36'' (having a strength of from 10° to 12° Bé., in the example given) passes through the overflow 37'', hydrometer jar 38'' and pipe 39'' to the surge jar 36' of the second tower B', and serves to dilute the circulating portion of the stronger acid which said jar has received through the pipe 35', the acid passing from the tower B' through said pipe may be of a strength, for instance, of 18° Bé. The absorbing acid issuing from the spray head 34' is therefore of a strength above 10° to 12° Bé., but below 18°; this absorbing acid has been cooled in the coil 41' and then raised through the pipe 44' by the air-lift 43'. Of course, the gas in the tower B' is stronger in HCl than the gas in the last tower B''. The (18° Bé.) acid overflowing from the surge jar 36' through the pipe 37', hydrometer jar 38' and pipe 39' passes to the surge jar 36 of the preceding tower B, where it serves as a diluent for the circulating portion of the still stronger acid which said jar has received through the pipe 35. For instance, this acid flowing from the tower B may be of the strength of the final product, e. g. 20° Bé. The absorbing acid issuing from the spray head 34 will thus have a strength of between 18° and 20° Bé., in the example given. The diluted acid is cooled in the coil 41 and forced by the air-lift 43 through the pipe 44 to said spray head 34; the remainder of the (20° Bé.) acid passes from the surge jar 36 through the overflow 37, hydrometer jar 38 and pipe 39 to the product line 19.

One half or more of the liquid acid delivered to the product line 19, therefore, is produced in the cooling tubes 12, so that the work to be done by the absorption towers B, B', B" (of which according to varying conditions a greater or a lesser number may, of course, be employed) is reduced considerably, and a greatly increased efficiency is obtained.

The liquid admitted at 26 preferably flows through the tubes 12 in the form of continuous streams, but satisfactory results will be obtained even if the liquid is allowed to simply drip or trickle through the cooling tubes 12.

The small percentage of HCl gas which remains unabsorbed escapes to the stack 33 through the pipe 30, exhauster 31 and pipe 32, together with any other gaseous remnant of the gas leaving the still A, and with the air admitted at 43 and 43' and reaching the towers B, B' through the pipes 44 and 44' respectively. The air admitted at 43" will escape from the open tank 45.

Figs. 2 and 3 illustrate certain details of a construction suitable for the cooling tubes 12 and their adjuncts, the general arrangement of some of these parts being indicated in Fig. 1. For each of the tubes 12 there is provided a tank 48 provided with an overflow over the serrated upper edge of a wall 49 extending down to contact with the uppermost horizontal member of the corresponding tube 12, the lower edge of said wall being likewise serrated. The tanks 48 are provided with partitions 50, and on the side of each partition opposite to the overflow is located a cock 51 for supplying cooling water to said tank. Between each two neighboring horizontal members of the same tube 12, and in the same vertical plane with the wall 49, are located guides 52, each of which has its upper edge formed with prongs 53 bent alternately in opposite directions and engaging the tube member above, while the lower edge is serrated as at 54 and engages the tube member below. Thus the water overflowing from the tank 48 will pass over the wall 49, the uppermost horizontal member of the tube 12, the uppermost guide 52, the next horizontal member of the cooling tube 12, and so in a cascade until it drips off the lowermost horizontal member of the tube. The latter is thus cooled efficiently.

It will be understood, however, that in winter air cooling will be sufficient, that is to say, the cocks 51 will be closed in winter.

It will be evident that the procedure may be modified in various ways, as by using a different number of absorption towers, without departing from the spirit of the invention set forth in the appended claims. Should it be found that a single pipe 21 with its air-lift 20 is insufficient in a particular case to raise the required amount of acid from the surge pot 15 to the receiver 22, two or more such pipes with air-lifts may be used to so convey the liquid acid. The same remark will apply to the pipe 40, 41, 44 and its air-shift 43, in connection with the absorption tower B, and to the corresponding pipes and air-lifts in connection with the towers B', B".

In the example described above, a commercial product is obtained at the outlet 14 of the battery of cooling tubes 12, and a product of the same character at the outlet 37 of the battery of absorption towers B, B', B" so that both products may be led to the same product line 19. It should be noted that acid of 23° Bé. and even 24° Bé. can be produced at very fair capacities in the battery of cooling tubes 12. The towers B, B', B" alone cannot produce acid of such a strength efficiently. Instead of producing in the cooling tubes 12 a liquid acid of sufficient strength to constitute the final commercial product, the process might be carried out in such a manner as to produce a relatively weak liquid acid, and this liquid acid might be strengthened in the absorption towers; for instance, such weak liquid acid might be used as the diluent supplied to the tank 45 at 46; that is to say, in this particular instance the pipe 18 would lead, not to the product line 19, but to the line ending at the cock 46.

The absorption of the HCl gases is almost complete, as is evidenced by the fact that the exit gases from the tower B" are at no time more than barely visible.

One of the salient advantages of preforming a large part of the absorption of gases in the battery of cooling tubes 12, lies in the considerable reduction effected in the size of the cooling system 41, 42, 41', 42', 41", 42" employed in connection with the circulating acid for the absorption towers B, B', B" as compared with the cooling system that would be required in connection with such circulating acid if the absorption of the same amount of gases were to take place exclusively in the towers. The new process reduces not only the size of the coolers proper in the path of the circulating tower acid, but the number of corresponding connections and fittings and the repairs and maintenance of these parts.

I claim:

1. The process which consists in causing a current of hydrochloric acid gas and an absorbing liquid to travel in mutual contact within a tube which is cooled externally, separating the resulting liquid hydrochloric acid from the unabsorbed gases, carrying away a portion of said liquid acid, diluting the remaining portion of said acid, and bringing the diluted acid into renewed contact with the hydrochloric acid gas in said tube.

2. The process which consists in causing a current of hydrochloric acid gas and an absorbing liquid to travel in mutual contact and in a downward direction within an externally cooled tube, separating the resultant liquid acid from the unabsorbed gases, carrying away a portion of the liquid acid, diluting a remaining portion of said liquid acid and bringing the diluted acid into renewed contact in a downward direction with the hydrochloric acid gas passing downwardly in said tube.

3. The process which consists in causing a current of hydrochloric acid gas and an absorbing liquid of much lower temperature than that of the gas to travel in mutual contact and in a downward direction within an externally cooled tube, separating the resultant liquid acid from the unabsorbed gases, carrying away a portion of the liquid acid, diluting a remaining portion of said liquid acid and bringing the diluted acid at a temperature much lower than that of the hydrochloric acid gas to be absorbed thereby, into renewed contact and in a downward direction with the hydrochloric acid gas passing downwardly in said tube.

4. The process which consists in causing a current of hydrochloric acid gas and an absorbing liquid to travel in mutual contact within a tube which is cooled externally, separating the resulting liquid hydrochloric acid from the unabsorbed gases, bringing these gases into contact with a different body of absorbing liquid, carrying away a portion of the liquid acid produced in said tube, diluting the remaining portion of said acid, and bringing the diluted acid into renewed contact with the hydrochloric acid gas in said tube.

5. The process which consists in causing hydrochloric acid gas and an absorbing liquid to travel in mutual contact downwardly within a tube which is cooled externally, separating the resulting liquid hydrochloric acid from the unabsorbed gases, carrying away a portion of said liquid acid, diluting the remaining portion of said acid, and introducing the diluted acid into said tube at the upper portion thereof, to bring such acid into renewed contact with the hydrochloric acid gas which travels downwardly in said tube together with said liquid acid.

6. The process which consists in causing dilute liquid hydrochloric acid in finely divided condition, to travel downward in a tower and bringing hydrochloric acid gas into absorptive contact within said tower, with the said dilute liquid acid, withdrawing part of the stronger liquid acid obtained by the absorptive action, and returning the remaining acid in a cooled and diluted condition to the upper portion of the tower to bring such cooled and diluted acid into renewed contact with the gas in said tower.

7. The process which consists in causing a current of hydrochloric acid gas to pass successively through a plurality of absorption towers, running dilute liquid hydrochloric acid down within the tower through which the gas passes last, in absorptive contact with such gas, withdrawing part of the stronger liquid acid obtained from said tower by said absorptive action, returning the remainder of said stronger liquid acid, in a cooled and diluted condition, to the upper portion of said tower to bring such cooled and diluted liquid acid into renewed contact with the gas in said tower, running dilute liquid hydrochloric acid of a greater strength than the absorption liquid used in said last tower, down within the preceding tower, in absorptive contact with the gas therein, withdrawing part of the stronger liquid acid obtained from said preceding tower by such absorptive action, and returning the remainder of the stronger liquid acid from such preceding tower, after dilution by means of the acid withdrawn from the last tower, and after cooling, into renewed contact with the gas in said preceding tower.

In testimony whereof I have hereunto set my hand.

JAMES ERNEST EGLESON.